United States Patent Office 3,328,352
Patented June 27, 1967

3,328,352
FLUORINE CONTAINING AROMATIC
POLYCARBONAMIDES
Stephanie Louise Kwolek, Wilmington, Del., assignor to
E. I. du Pont de Nemours and Company, Wilmington,
Del., a corporation of Delaware
No Drawing. Filed June 17, 1963, Ser. No. 288,473
8 Claims. (Cl. 260—47)

This invention relates to a novel and useful composition of matter. More specifically it concerns a novel and useful class of polyamides.

It is an object of the present invention to provide an aromatic polyamide having a melting point above about 350° C. and sufficient solubility in organic solvents to permit spinning of fibers and forming of films therefrom.

Another object is to provide a high melting aromatic polyamide which may be draw-oriented at relatively low temperatures.

These and other objects will become apparent in the course of the following specification and claims.

In accordance with the present invention there is provided a linear, fiber-forming, synthetic polycarbonamide wherein recurring carbonamide linkages are an integral part of the polymer chain from the class consisting of a homopolymer and a copolymer, the said homopolymer and copolymer consisting essentially of recurring units of the class consisting of

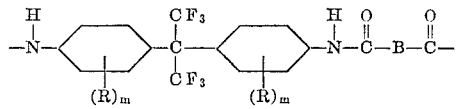

and

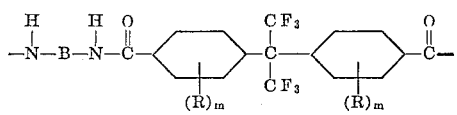

wherein B is a divalent radical from the class consisting of

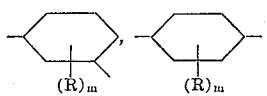

and

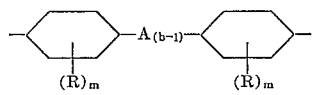

A is a divalent radical from the class consisting of
—CH₂—,

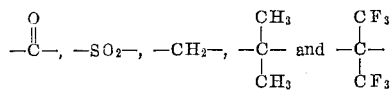

R is a monovalent replacement for hydrogen on nuclear carbon from the class consisting of —Cl, -lower alkyl and -lower alkoxy;
$m$ is a number from 0 to 2 inclusive;
$b$ is a number from 1 to 2 inclusive;
and the hexagon represents the benzene nucleus;

other copolymeric units whenever present constituting no more than about 10% of the recurring polycarbonamide units, the said polycarbonamide having a melting point of at least about 350° C. and an inherent viscosity of at least about 0.6 in sulfuric acid at 30° C. at a concentration of 0.5 gram of polymer per 100 cc. of solution.

High molecular weight polymers of this invention are prepared by interfacial or solvent polymerization by reacting an aromatic diacid chloride with an aromatic diamine, the acid groups of the diacid chloride and the amine groups of the diamine being meta or para oriented on each ring, at low temperatures (below 100° C.). These processes are described in detail in U.S. 2,831,834 to Magat (Apr. 22, 1958) and U.S. 3,063,966 to Kwolek, Morgan and Sorenson (Nov. 13, 1962).

The following examples illustrate the invention. All parts and percentages are by weight unless otherwise indicated. Unless otherwise indicated inherent viscosity reported in the examples is determined in sulfuric acid (sp. gr. 1.841 at 60° F.), at 30° C. at a concentration of 0.5 gram polymer per 100 cc. of solution. All polymers of this invention have an inherent viscosity of at least about 0.6 on this basis and a melting point of at least about 350° C.

*Example 1*

Ditolylperfluoropropane is prepared by condensing 37 grams of toluene (0.4 mole) with 32 gm. (0.2 mole) of perfluoroacetone (prepared by the oxidation of perfluoroisobutylene as described by Brice et al., J. Am. Chem. Soc. 75, 2698 (1953)) in 66 grams of anhydrous hydrgen fluoride in a sealed bomb under autogeneous pressure for 10 hours at 140° C. After venting off the hydrogen chloride, the ditoloylperfluoroprene is recovered. It is then oxidized by incremental addition of 115 gm. of potassium permanganate to a solution of 33 gm. dissolved in 185 cc. of 2/1, pyridine/water mixture, the addition of a solid permanganate being regulated to maintain the solution under gentle reflux. Excess potassium permanganate is then destroyed by adding a small amount of methanol. The brown suspension is then filtered to remove solid manganese dioxide and an excess of hydrochloric acid is added. The product, 2,2-bis(4-carboxyphenyl)hexafluoropropane, precipitates in an essentially pure form. It is dried under vacuum at 100° C. and then converted to the diacid chloride by refluxing in 150 cc. thionyl chloride containing a few drops of dimethylformamide as catalyst until the acid dissolves completely. The thionyl chloride is then distilled off over the steam bath first at atmospheric pressure and then under a slight vacuum. The solid 2,2-bis(4-chlorocarbonylphenyl)hexafluoropropane is thereafter crystallized from hexane.

In a small round-bottomed flask equipped with mechanical stirrer, as well as a stoppered opening for admitting reactants, are placed 2.483 g. (0.01 mole) of bis(4-aminophenyl) sulfone, 3.20 ml. of N,N-diethyl-aniline, and 30 ml. of 2,4-dimethyltetramethylene sulfone. The solution is cooled with ice and water and there is added all at once 4.292 g. (0.01 mole) of the solid 2,2-bis(4-chlorocarbonylphenyl) hexafluoropropane. The acid chloride slowly dissolves over a period of 2 hrs. during which time the mixture is stirred. There is a gradual increase in viscosity. As a matter of convenience, the system is stirred for an additional 22 hrs. at about 27° C.

The polymer is isolated by precipitation in vigorously stirred water, collection on a filter, and thorough washing with 50% aqueous ethanol and water. The polymer is dried at 70° C. under vacuum. The yield is 7.8 g. The product has an inherent viscosity of 0.70 (H₂SO₄) and does not melt below 350° C.

The procedure is repeated using equimolecular weights of 2,2-bis(4-chlorocarbonyl - phenyl)hexafluoropropane and the diamines of Table I. The polymers have the properties indicated in the table.

TABLE I

| Diamine | Inherent Viscosity | Polymer Melt Temp. (° C.) |
|---|---|---|
| 4-methyl-m-phenylenediamine | 0.81 | Above 350. |
| 3,3'-dimethoxydianiline | 1.1 | Above 375. |

Example 2

In a blender jar are placed 2.263 g. of 2,2-bis(4-aminophenyl) propane, 2.120 g. of $NaHCO_3$, 75 ml. of dry tetrahydrofuran, and 75 ml. of water. 2,2-bis(4-chlorocarbonylphenyl)hexafluoropropane (4.292 g.) in 45 ml. of tetrahydrofuran is added quickly with vigorous stirring and stirring is continued for 5 min. The mixture is diluted with water and the polymer is collected, washed and dried. The yield is 6.0 g.; the inherent viscosity is 1.14 (sym-tetrachloroethane-phenoyl, 40–60 by wt.); PMT, above 400° C.

Equivalent polymer is obtained by use of 2.120 g. of $Na_2CO_3$ as the acid acceptor.

The procedure is repeated but substituting m-phenylene diamine for the diamine reactant, in an amount equimolecular to the hexafluoro substituted dibasic acid. The resulting polymer has an inherent viscosity in m-cresol of 1.05 and a polymer melt temperature above 400° C.

Example 3

The compound 2,2-bis(4-aminophenyl) hexafluoropropane is prepared in a Hastelloy bomb using a mixture of 83.02 g. (0.5 mole) of hexafluoroacetone, 93.02 g. (1.0 mole) of aniline (distilled from KOH pellets), 2.5 g. of anhydrous aluminum chloride, and 250 ml. of dry benzene. The mixture is heated for 10 hrs. at 250° C. The black product is extracted with aqueous hydrochloric acid (10%); the extract is made basic (pH 14) with NaOH; and the precipitate is filtered. The solid is crude diamine which is purified by reprecipitation from aqueous acid and/or by crystallization from ether. The pure product (26% yield) melts at 195–196° C. The diamine is then polymerized with an equimolecular weight of the chlorocarbonyl derivatives of a series of dibasic acids as identified in Table II using the technique of Example 1. Properties of the products are reported in the table.

TABLE II

| Acids | Inherent Viscosity | Polymer Melt Temperature (° C.) |
|---|---|---|
| Isophthalic | 0.6 | 348. |
| Terephthalic | 0.65 | Above 400. |
| 5-buthylisophthalic | 0.72 | Above 350. |
| 5-chloroisophthalic | 0.77 | Do. |
| Isophthalic/terephthalic [1] | 0.72 | Do. |
| 2,2-bis(4-carboxyphenyl)hexafluoropropane. | 0.73 | Above 400. |

[1] A 50/50 mixture.

The polymer prepared from isophthalic acid is dissolved in dimethylformamide to make a solution containing 10% by weight solids and a clear, flexible film is cast from this solution.

Among the starting materials suitable for preparing polymers of this invention are included (A) diamines such as benzidine, bis(4-aminophenyl)methane,
2,2-bis(4-aminophenyl)propane,
bis(4-aminophenyl)sulfone,
4,4'-diaminobenzophenone,
2,2-bis(4-aminophenyl)hexafluoropropane,
2,2-bis(4-amino-3-methylphenyl)hexafluoropropane,
2,2-bis(4-amino-3,5-dimethylphenyl)hexafluoropropane and the chloro and bromo ring substituted analogues of each; m-phenylene diamine, p-phenylene diamine, 4-methyl-m-phenylene diamine, 2,6-dimethyl-p-phenylene diamine, bis(4-amino - 3 - methylphenyl)methane, 3,3'-dimethylbenzidine, p-xylylenediamine, the chloro and bromo ring substituted analogues of each and the like and (B) diacid halides such as 2,2-bis(4-chlorocarbonylphenyl)hexafluoropropane, 2,2-bis(2-chloro-4-carbonylphenyl)hexafluoropropane, isophthaloyl chloride, terephthaloyl chloride, 5-butyl isophthaloyl chloride, bis (4-chlorocarbonylphenyl)sulfone, bibenzyl chloride, 4,4'-benzophenonedicarbonyl chloride, bis(4-chlorocarbonylphenyl)methane, 2,2-bis(4-carbonylphenyl)propane, and the ilke. Copolymers of these reactants and those employed in the specific examples can be made in any proportion by mixture of appropriate diamines and/or acids. In addition, up to about 10% polymer-forming ingredients which may or may not contain an aromatic nucleus can be included without seriously detracting from the extraordinary physical and chemical properties of the polymers of this invention. Typical aliphatic copolymerizable starting materials include diamines such as ethylene diamine, tetraethylene diamine, hexamethylene diamine, decamethylene diamine and the like and dibasic acids such as malonic, adipic, and sebacic. Preferably, however, the diamine and diacid compounds utilized will be wholly aromatic, thus resulting in a polymer characterized entirely by structural units with all of the nuclei containing aromatic radicals. Typical aromatic copolymerizable starting materials include diamines such as m-phenylene diamine, p-phenylene diamine, 2,6-dichloro-p-phenylene diamine, bis(4-aminophenyl)methane, 3,3'-dichlorobenzidine, p-xylylenediamine and the like and dibasic acid chlorides such as those of isophthalic, terephthalic, bis(4-carboxyphenyl)sulfone, bis(4-carboxyphenyl)ether, bibenzoic acid and the like. In addition alicyclic copolymerizable starting materials such as hexahydro-p-phenylene diamine and hexahydroterephthalic acid chloride as well as heterocyclic materials such as piperazine and the like may be employed. The nature of the linking radical in the chain is not critical in the copolymeric component of the chain and may be other than carbonamide. For instance the linkage of the copolymeric component may be sulfonamide (by substituting a disulfonic acid for a minor proportion of dicarboxylic acid chloride), ester (by substituting a glycol for a minor proportion of diamine), urethane (by substituting a bischloroformate for a minor proportion of dicarboxylic acid chloride) or urea (by substituting phosgene for a minor proportion of dicarboxylic acid).

The polymers of this invention are especially useful for the shaping of fibers and films for uses of such products where extreme resistance to high temperature exposure are required. It has been found that these polymers have a lower glass transition temperature and higher solubility in available solvents than is usual for polymers of such high melting point. This combination of properties greatly facilitates dry spinning from solutions of such polymers and permits orientation drawing of the resulting structures at relatively low temperatures. It has also been found that polymers of this invention have substantially improved resistance to soiling compared to the simple aromatic polycarbonamides. Furthermore, polymers of this invention adhere well to aluminum.

Many equivalent modifications of the above will be apparent to those skilled in the art from a reading of the above without a departure from the inventive concept.

What is claimed is:

1. A linear, fiber-forming, synthetic polycarbonamide wherein recurring carbonamide linkages are an integral part of the polymer chain from the class consisting of a homopolymer and a copolymer, the said homopolymer and copolymer consisting essentially of recurring units of the class consisting of

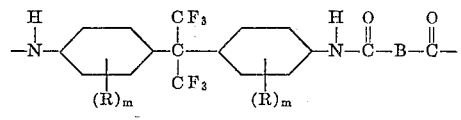

and

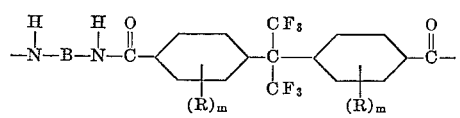

wherein
B is a divalent radical from the class consisting of

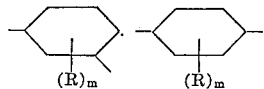

and

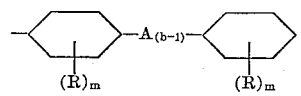

A is a divalent radical from the class consisting of
—CH₂—

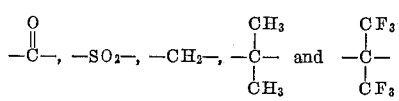

R is a monovalent replacement for hydrogen on nuclear carbon from the class consisting of —Cl, -lower alkyl and -lower alkoxy;
$m$ is a number from 0 to 2 inclusive;
$b$ is a number from 1 to 2 inclusive;
and the hexagon represents the benzene nucleus;
other copolymeric units whenever present constituting no more than about 10% of the recurring polycarbonamide units, the said polycarbonamide having a melting point of at least about 350° C. and an inherent viscosity of at least about 0.6 in sulfuric acid at 30° C. at a concentration of 0.5 gram of polymer per 100 cc. of solution.

2. The polycarbonamide of claim 1 wherein the recurring unit is

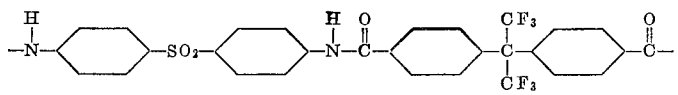

3. The polycarbonamide of claim 1 wherein the recurring unit is

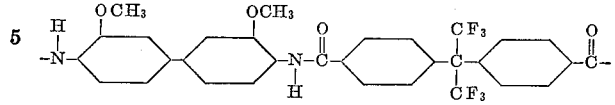

4. The polycarbonamide of claim 1 wherein the recurring unit is

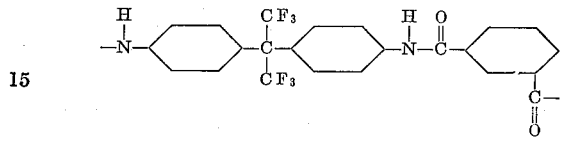

5. The polycarbonamide of claim 1 wherein the recurring unit is

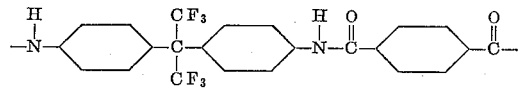

6. The polycarbonamide of claim 1 wherein the recurring unit is

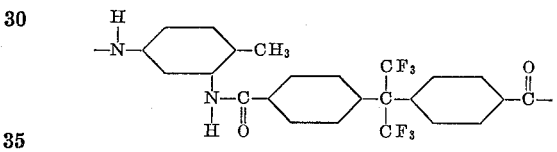

7. A fiber of the polymer of claim 1.
8. A film of the polymer of claim 1.

References Cited
UNITED STATES PATENTS

| | | | |
|---|---|---|---|
| 2,570,180 | 10/1951 | Allewelt | 260—78 |
| 3,062,787 | 11/1962 | England | 260—78 |
| 3,081,281 | 3/1963 | Beghin | 260—78 |
| 3,094,511 | 6/1963 | Hill et al. | 260—78 |
| 3,194,794 | 7/1965 | Caldwell et al. | 260—78 |

FOREIGN PATENTS

| | | |
|---|---|---|
| 632,997 | 12/1949 | Great Britain. |

WILLIAM H. SHORT, *Primary Examiner.*
H. D. ANDERSON, *Assistant Examiner.*